United States Patent Office 3,170,486
Patented Feb. 23, 1965

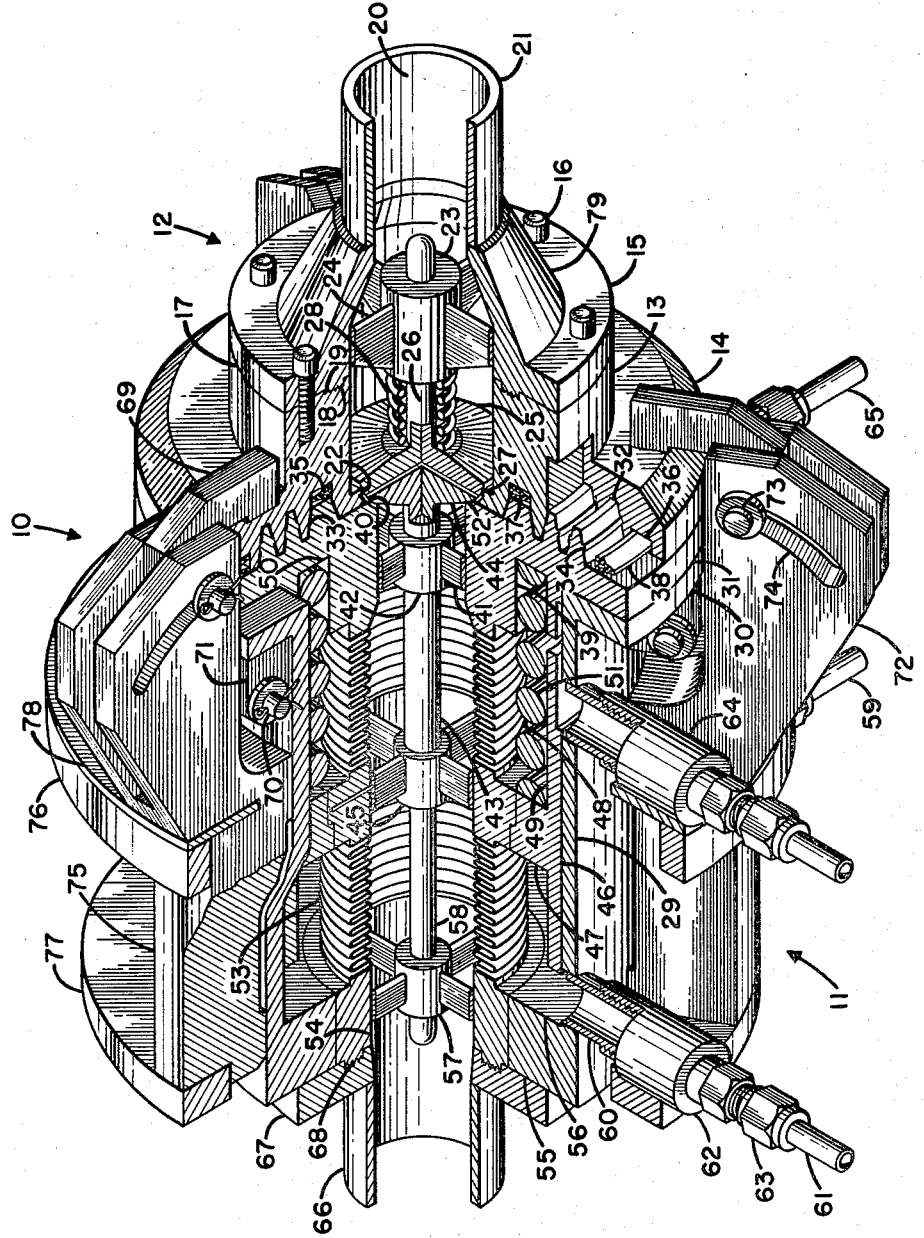

3,170,486
FLUID COUPLING
Richard L. De Witt, Rocky River, and Harold W. Schmidt, Cuyahoga Falls, Ohio, assignors to the United States of America as represented by the Administrator of the National Aeronautics and Space Administration
Filed May 16, 1962, Ser. No. 195,346
5 Claims. (Cl. 137—614)
(Granted under Title 35, U.S. Code (1952), sec. 266)

The invention described herein may be manufactured and used by or for the Government of the United States of America for governmental purposes without the payment of any royalties thereon or therefor.

The present invention relates generally to a valve for controlling liquid flow and, more particularly, to a two-component valve assembly for regulating the transfer of liqued which is capable of being readily disconnected and reconnected allowing zero external leakage and spillage during the operation.

The invention further relates to a remotely operated valve section which is capable of being quickly connected and disconnected to a matching section which is stationary in fixed relation to the wall of a missile, rocket or other space vehicle having valve actuating means hermetically isolated from the liquid flow path by a passageway comprising a longitudinally expandable and contractable wall, the wall cooperating with the actuating means to operate a valve system housed within the passageway.

With the advent of space investigation, the use of cryogenic liquids has become widespread; they are employed in rockets, missiles and other space vehicles for various purposes, particularly as a fuel. In addition to being hard to handle because of their extremely low temperatures and explosive character, some of these cryogenic liquids such as liquid fluorine are extremely corrosive and pose problems in preventing their escape during the transfer from the source of supply to the space vehicle. Moreover the elusive character of these cryogenic liquids requires that the filling of the space vehicle be performed at the very last minute while the said vehicle has been erected on a launching pad, requiring operation by remote control.

To be effective in transporting liquids from the source of supply to the space vehicles the connection thereto and the disconnection therefrom must be effective very rapidly by the remotely operating means allowing only a negligible amount of spillage. After the rocket or space vehicle has been supplied with a sufficient amount of cryogenic liquid and the source of supply disconnected, the means of communication into the missile must be sealed from the outside with a lasting durable seal. If such a seal is not effected the cryogenic liquid escapes, restricting the time the vehicle may be employed in outer space. This seal may have to be repeatedly reformed as a need for more cryogenic liquid recurs.

At present there are no devices particularly combining the necessary attaching arrangement with a liquid control valve assembly which can be remotely actuated for both operations and also handle cryogenic liquids, particularly those of a corrosive nature. When corrosive cryogenic liquids such as liquid fluorine are employed, all of the known valve assemblies or systems fail to provide a remotely operable system for controlling the flow of liquid fluorine which is also capable of connection, quick disconnection and reconnection through repeated cycles with almost no spillage of the liquid during the transportation thereof.

Accordingly, it is an object of the instant invention to provide a means for connecting a source of supply of a cryogenic liquid to a rocket or space vehicle which is capable of quick disconnection and reconnection.

It is another object of the instant invention to provide a valve assembly which is capable of quick disconnection and reconnection allowing only the minimum in spillage.

It is still a further object of the instant invention to provide a valve assembly which may be employed as above to control the flow of corrosive cryogenic liquids.

Another still further object of the instant invention is to provide a valve assembly as above indicated which is capable of being actuated from a remote position wherein the valve being actuated cooperates to open a mating valve in the rocket or space vehicle.

Additionally, it is particularly an object of the instant invention to provide a remotely operable valve section which is capable of being quickly connected and disconnected to a matching section which is stationary in fixed relation to the wall of a space vehicle, having valve actuating means isolated from a liquid flow path by a passageway comprising a longitudinally expandable and contractable wall adapted to cooperate in a "peristalic" like manner with the actuating means to operate a valve system housed within the passageway.

Other objects and advantages of the present invention will become apparent as the following description proceeds.

In accordance with the objects of the present invention there is provided a two-component valve assembly for controlling the flow of cryogenic liquids comprising a quick disconnect section and a stationary section, each being removable from the other at parting surfaces adapted to facilitate the bringing of the two sections together in a fixed alignment forming a pressure tight interface. The stationary section is permanently set into the outside wall of the space vehicle and functions as a means of communication from the source of supply of the cryogenic liquid to the reservoir of the vehicle. The quick disconnect section, on the other hand, provides the connecting and disconnecting feature of the instant invention and remains with the source of supply after the launching of the space vehicle. The two sections comprise hollow main bodies having mating ends adapted to form a sealed interface with each other with an axially aligned valve body in each end cooperating with valve seats provided at the periphery of two axially-aligned apertures, one aperture being at the mating end of the disconnect section and the other aperture being in the mating end of the said stationary section and providing communication between the two sections. The valve body in the quick disconnect section is held in a normally closed position by tensile forces translated through a valve stem fixedly attached to a force translating member axially movably situated within the disconnect section from a first biasing means exerting pressure against the said member in a direction away from the interface. During operation the valve is opened to liquid flow by imposing a flow of pressurized gas against the force translating means to counteract the said biasing means releasing the valve body from tension and moving it into an open position into contact with the valve body in the stationary section to move the body to an open position, the second valve body being held in a normally closed position by another biasing means exerting compressive forces against the back of the said second valve body. The liquid flow path through the quick disconnect section is provided by a wall longitudinally expandable and contractable in a "peristalic"-like manner extending from either side of the force translating member to the inlet and to the aperture which isolates the biasing means from the path of the liquid while at the same time cooperating with the longitudinal movement of the force translating member without allowing communication between the liquid flow path and the biasing means.

A better understanding of the present invention will be had by reference to the accompanying drawing showing a preferred embodiment in which:

The figure is an isometric view of the entire valve assembly showing the two sections wherein the valve bodies are in a closed seated position.

Referring to the drawing, the figure illustrates a valve assembly advantageously employed for controlling the flow of cryogenic liquids from a source into the reservoir of a space vehicle or other apparatus which uses the liquids, the valve assembly being capable of quick disconnection and reconnection. The component sections making up the complete valve assembly 10 consist of a quick disconnect section 11 removably locked to stationary section 12 in a liquid and gas tight relationship.

Stationary section 12 which is to be set in a wall (not shown) of the rocket or other space vehicle as a permanent inlet for the cryogenic liquid, conveniently comprises a cylindrical main body 13 integral with radially-extending flange 14, removably bolted to wall adapter 15 with bolts 16 providing radially-sectioned zone 17 to be occupied by the wall section (not shown) immediately surrounding an opening in the section. Radially spaced from the axis is recess 18 in section 12 comprising concentric serrations having sharp ridges capable of "biting" into a soft metal gasket such as lead or aluminum, and forming a gas-liquid seal with matching serrations in adapter 15.

Extending longitudinally and coaxially through the entire stationary section is fluid passageway 20 providing liquid communication between outlet 21 and opening 22. In addition to conducting fluids, particularly cryogenic liquids, passageway 20 provides a housing for valve stem guide 23 supported coaxially within passageway 20 by spider supports 24 and poppet valve element 25 integral with valve stem 26 which slidably extends into valve stem guide 23. Valve element 25 cooperates with valve seat 27 at the periphery of opening 22 and is held in a normally closed position by coil spring 28 (or any other suitable biasing means) which is maintained under compression by valve guide 23 and the back of valve element 25 bearing against seat 27. Valve stem 26 is dimensioned to permit sliding within guide 23 to provide for unseating of valve element 25 during transport of liquid into the space vehicle and reseating of the valve body by action of spring 28 after the vehicle has been filled; and which action maintains the seated valve element 25 in a lasting gas and liquid tight seal with valve seat 27. The fact that the valve element 25 maintains a gas and liquid seal with the valve seat 27 is important because many space vehicles will be traveling in space for many months or even years; losses of the cryogenic liquid which is vital to its many functions would necessarily be fatal to the operation of the vehicle and its occupants.

Quick-disconnect section 11 is conveniently of a generally cylindrical configuration comprising a cylindrical main wall 29 of substantially uniform cross-section providing a hollow casing integral with flange 30 which is substantially radially coextensive with flange 14.

Flush against and also radially coextensive with flange 30 is mating end 31 providing a surface of radially spaced lands and grooves 32 matching complementary lands and grooves 33 in the mating end of the stationary section 12 provided at the longitudinal terminus of the main body 13 and flange 14. Raised portions 34 on the wall of lands and grooves 32 facilitate connection and disconnection by significantly reducing the frictional area of contact at the walls of the lands and grooves. Recessed in the face of the mating end of the stationary section and radially bounding the lands and grooves are annular grooves 35 and 36 containing V rings 37 and 38 respectively. When the two sections are together in locked relationship, as shown, the two mating ends provide an interface having a radially extending tortuous path which is sealed at both ends by the surface of the mating end of the disconnect section bearing against V rings 37 and 38.

Integral with mating end 31 is valve stem guide housing 39 extending coaxially into disconnect section 11 from opening 40 in mating end 31. Supported coaxially within housing 39 by spider supports 41 is valve stem guide 42. Extending through guide 42 and in slidable relationship therewith is valve stem 43 which is integral with poppet valve element 44 and in fixed attachment with spider 45. Coaxial with cylindrical main wall 29 is force translating slider 46 dimensioned to permit free longitudinal movement along the inner surface of wall 29. Integral with slider 46 is annular flange 47 extending inwardly in a plane substantially perpendicular to the axis, and providing a cylindrical housing for spider 45 which also permits liquid communication longitudinally across spider 45.

Extending longitudinally from the periphery of one side of the flange 47 is tubular bellows 48 forming a passageway from the flange 47 to the inner face of annular housing 39 and at the same time isolating a radial zone 49 extending longitudinally along the outer surface of housing 39 to annular bearing surface 50 provided by the inner side of mating end 31. Located in zone 49 is coil spring 51 exerting a biasing force against flange 47 which is translated through spider 45, along valve stem 42 to valve element 44 which in turn bears against valve seat 52 adapted to cooperate with the said valve element 44 to form a liquid tight seal. Extending longitudinally from the periphery of the other side of flange 47 is tubular bellows 53 forming a passageway from the flange 47 to inlet port 54 in inwardly extending flange 55 and also isolating radial zone 56.

In addition to providing inlet port 54, flange 55 acts as a housing for guide 57 dimensioned to permit stem 58 to move smoothly along its inside surface, said stem 58 being integral with valve stem 43 and extending axially therefrom to insure true axial movement of valve element 44.

Providing gaseous communication with radial zone 56 are gas outlet 59 and gas inlet 60 to permit the application and withdrawal of pressurized gas to the said zone. Inlet 60 is threadably connected to gas-source conduit 61 (partially shown) by way of reducer fitting 62 forming a gas tight seal with the flared end (not shown) of conduit 61. The seal is maintained by female drawing fitting 63 screwed to the male end of fitting 62 to force the flared end of conduit 61 against the face of the said male end.

Gas outlet 59 is also provided with a similar connection to a conduit (partially shown) leading to a reservoir (not shown). Zone 49 is provided with gaseous communication by inlet 64 and outlet 65 to a gas source and reservoir respectively through connections which are also similar to the connection described above.

The quick disconnect section 11 is preferably mounted on a rigid or flexible pipe 66 to which serves as a conduit for the cryogenic liquid.

Pipe 66 is axially secured to quick disconnect section 11 by bolts (not shown) extending through flange 67 into the outer annular face of flange 55. Radially spaced in flange 67 from the axis is annular recess 68 having concentric sharp serrations capable of "biting" into a soft metal gasket such as lead or aluminum forming a liquid seal with matching serrations in flange 55.

As shown in the drawing quick-disconnect section 11 is locked to stationary section 12 by C-shaped finger 69 rotatably anchored to the cylindrical main body 29 with pin 70 passing through two parallel mounting members 71 (partially shown) and converging in planes cutting the longitudinal axis around flange 14 to bear against the opposite annular face of the flange. Controlling the rotational movement of C-shaped fingers 69 are drivers 72 comprising two spaced parallel walls sandwiching the plane defined by the rotation of fingers 69. Extending through the walls of the driver 72 and finger 69 is pin 73.

Curved elongated aperture 74 which continues in a path of a generated curve greater than the curve generated by pin 73 having pin 70 as its axis provides for the restricted and controlled rotation of finger 69; as the driver is moved axially the curve of the elongated aperture cuts the curve generated by pin 73 at continually changing loci which moves pin 73 to the said locus cut by the greater curve. Supporting drivers 72 are integral longitudinal bases 75 bridging annular rings 76 and 77 coaxially surrounding main body 29. Annular disk 78 is optionally employed as an engineering expedient to firmly connect annular ring 76 to the driver 72 and its base 75.

In operation of the valve assembly 10, quick-disconnect section 11 is brought into mating contact with stationary section 12 by directing means (not shown). Pipe 66 is in communication with a pressurized source of a cryogenic liquid. After the mating contact has been made between the two sections, the driver assembly slidably surrounding the outside of cylindrical main wall 29 and comprising driver 72, annular rings 76 and 77, bridged by longitudinal section 75, is driven rearward from stationary section by any suitable driving mechanism (not shown) such as a mechanical translating means, an electrical magnetic means or an electro-mechanical means such as a solenoid operated driver. As the driver is moved rearwardly the locus on a curve generated by pins 73 having pins 70 as their axis cut by the curve of elongated apertures 74 moves toward the axis of the assembly whereby C-shaped finger 69 are moved in a converging manner toward the axis over flange 14 to bear against the inner annular surface of flange 14. The two sections are then held together in a locked relationship by maintaining the said driver assembly in the rearward position. Cryogenic liquid coming from the pressurized source is then transferred through both sections of the valve assembly and discharged from outlet 21 into the desired reservoir. In actual use stationary section 12 is permanently affixed to the wall of the missile, rocket or space vehicle which is to use the cryogenic liquid which is in liquid communication with the reservoir through passageway 20. Tapered wall 79 is optionally provided to adapt to a conduit of a lesser diameter.

In order to convey the pressurized cryogenic liquids from disconnect section 11 into stationary section 12 and eventually into the reservoir of the space vehicle, pressurized gas is admitted into the radial zone 56 through inlet 60 from a pressurized gas source conveyed through conduit 61. As the pressure increases within zone 56 the biasing force of coil spring 51 bearing against the annular flange 47 of force translating member 46 is counteracted by the gas pressure and compressed by axial movement of the said force translating member. As the force translating member moves to compress coil spring 51, valve stem 43 is moved through valve guide 42 to unseat valve element 44. As valve element 44 moves from valve seat 52 contact is made with valve element 25 in the stationary section; coil spring 28 is then compressed and valve element 25 is also moved from its seat 27 into an open position. The pressurized cryogenic liquid is then free to flow through the entire valve assembly and into the reservoir.

After the desired amount of cryogenic liquid has been transported into the reservoir, the gas pressure is released through gas outlet 59 whereby valve elements 25 and 44 automatically move into a closed relationship with valve seats 27 and 52 respectively by action of coil springs 28 and 51 respectively. Gas inlet 64 is provided as an optional feature to effect the fastest possible closing of the valve elements by providing for the admission of gas pressure into zone 49 simultaneously with the expulsion of gas from zone 56 whereby the force of the gas pressure is added to the biasing force of coil spring. It is also an advantage to use gas pressure for closing where insurance is desired against leaking at the valve seat. After the valves have been closed the driver assembly is moved forwardly to rotate C-shaped fingers 69 to an open position permitting removal of the quick-disconnect section from the said stationary section with very little loss of any of cryogenic liquid due to spillage and/or leakage. Repeated connections and disconnections may subsequently be performed in the above-described manner requiring only a few seconds for each operation.

After the disconnect section has been removed from the stationary section a permanent seal of the reservoir is made from the outside surface of the space vehicle or rocket by the expansion of coil spring 28 maintaining valve element 25 in a seated relationship with valve seat 27 requiring no further capping or otherwise closing of the inlet 22 into the space vehicle.

The apparatus of the instant invention may be varied in structure particularly in regard to the locking mechanism, and the detailed structure of the overall assembly. Important considerations are in providing an interface which is liquid and gas pressure tight and a locking mechanism which can maintain the said interface in this manner and also be capable of repeatedly effecting the formation of the interface.

There is no real criticality in the composition of the materials of construction except organic chemical based compositions should not come in contact with the corrosive cryogenic liquids such as fluorine. Stainless steel is preferable because of its mechanical strength but brass, aluminum, copper and Monel may also be used. It is quite surprising that tubular bellows can be advantageously employed in the manner of the instant invention because of apparent corrosive action of cryogenic liquids such as liquid fluorine. The bellows permit the practical reduction to use of a valve element seating arrangement providing optimum conditions for seating of the element with the seat and also utilizing the action of one of the reciprocating valves to open another corresponding valve, wherein the overall assembly meets all of the aforementioned requirements.

The unique design of the instant invention eliminates the need for any packing glands around the valve stem, wherein the entire valve element and stem is sealed over all possible positions from the actuating means. Consequently, the corrosive cryogenic liquids such as liquid fluorine may be used without being concerned with the possibility of reaction with packing glands which are also a common site for leakage. In lieu of tubular bellows other longitudinally expanding and contracting cylindrically walled or cross-sectional passageways may be used. The criteria for determining operability is the ability to move in a "peristaltic" like manner with movement of the force translating means during actuation of the valve system.

Advantageously employed with the valve assembly of the instant invention is a particular valve body seating arrangement which is the subject of patent application Serial No. 212,174, filed July 24, 1962. This arrangement comprises a valve seat having a recessed seating face substantially of a spherical configuration and a valve element having a circular seating face smaller than the great circle of the spherical valve seat cooperating with said valve seat to form a zero-leak seal, said valve element comprising the wall defining at least a frustum of the right circular cone with the said seating face at its base and perpendicular to the hypotenuse of the generating triangle of the cone. This valve element-seat system provides a metal-to-metal seal which is entirely zero-leak to all cryogenic liquids and which may be actuated many times without distorting or changing the structure of the said system.

A particular shape of the apparatus of the instant invention is only governed by engineering expedients and in providing a housing for a liquid flow path which isolates the valve actuating means but at the same time acts as a housing for the reciprocating valve element seating system which is also utilized to open the valve in a section which is adapted to mate with the said body of the said housing in a quickly connectable, disconnectable and reconnectable manner.

Because of the extremely low temperatures of the cryogenic liquids the formation of frost on the mating surfaces is likely to occur if the surfaces remain apart for an extended time before reconnection during the same loading operation. This problem may be effectively overcome by providing outlets around the periphery around the mating ends of both sections to permit the flow of dry inert gas forming a conical profile of dry artifical atmosphere to drive away the moisture laden air in the immediate vicinity of the mating surfaces.

The tubular bellows employed with the instant invention should be designed with sufficient "hoop" strength and with the sufficient number of convolutions per length to prevent stretching them past the elastic limit.

Other designs utilizing the features of the instant invention are also envisioned and are considered part of the instant invention.

The present invention is not limited to the embodiments described and illustrated but includes all those embodiments falling within the scope of the appended claims.

What is claimed is:

1. A detachable liquid flow control component for cooperative engagement with a fixedly mounted liquid control component, said detachable component comprising: a hollow body providing a flow passage and an open end face; a valve element extending outwardly from said open end face; means in said hollow body to yieldingly bias said valve element to closed position; a slideable member extending longitudinally within said hollow body; said slideable member formed with an intermediate annular flange extending inwardly toward the flow passage of said hollow body; inlet means for supplying pressurized gas to said hollow body; and a bellows attached to said inwardly extending annular flange for isolating the flow passage from the inlet means whereby pressure against said inwardly extending annular flange overrides said biasing means to actuate said valve element to open position.

2. A detachable liquid flow control component for sealing engagement with a fixedly mounted liquid flow control component including a body having an exposed end face with a sealable engaging surface, a flow passage extending through said body and terminating exteriorly in an inlet opening in said end face, and a valve element movably mounted in said flow passage yieldably biased to close said inlet opening, said detachable component comprising: a hollow body providing a flow passage; said hollow body having an end face conformed for sealing engagement with the said exposed face of the fixedly mounted component; a valve element movably mounted in said hollow body to extend outwardly therefrom in open position and adapted to contact the valve element of said fixedly mounted component and move it into open position when said components are in sealing engagement; spring means in said hollow body to yieldingly bias its valve element to closed position; first and second annular guide means mounted in said hollow body; valve stem means fixed to said valve element of said hollow body and extending through said guide means in sliding relation therewith; a force translating slideable member extending longitudinally within said hollow body formed with an intermediate annular flange extending inwardly toward the flow passage of said hollow body; a spider member fixed to said valve stem means between said first and second annular guide means and engaging said inwardly extending annular flange for concurrent movemet therewith; inlet means for supplying pressurized gas to said hollow body; and a bellows attached to said inwardly extending annular flange for isolating the flow passage from the inlet means whereby pressure against said annular flange overrides the biasing means to actuate said valve element to open position.

3. A detachable liquid flow control component as set forth in claim 2 having coupling means, said coupling means comprising: a ring means coaxially surrounding said hollow body; a plurality of driver members mounted for longitudinal movement with said ring means; each of said driver members having a curved aperture formed therein; a C-shaped finger pivotally attached to said hollow body for each said driver member; and a pin attached to each of said C-shaped fingers extending into the curved aperture in its respective drive member whereby longitudinal movement of said drivers cams said C-shaped fingers and sealingly couples said detachable and fixedly mounted liquid flow control components.

4. A detachable liquid flow control component for cooperative engagement with a fixedly mounted liquid flow control component including a body terminating in a radially extending flange, said flange having an exposed engageable sealing end face, a flow passage extending axially through said body, and a valve element movably mounted in said flow passage, said detachable component comprising: a hollow body having a mating end conformed for sealing engagement with the end face of said fixedly mounted component; means forming a liquid conduit extending axially through said hollow body; a valve element movably mounted in said hollow body; and locking means for rigidly connecting said flow components together including a plurality of C-shaped fingers pivotally attached to said hollow body, a pin fixed to each of said C-shaped fingers and extending outwardly therefrom, a longitudinally movable driver for each of said C-shaped fingers having means forming an elongated curved aperture, one of said pins disposed in said aperture and connecting one of said C-shaped fingers and driver whereby selected longitudinal movement of said driver cams said C-shaped finger into abutting relationship with the radially extending flange of said fixedly mounted component to sealingly lock said flow components together.

5. A detachable liquid flow control component as set forth in claim 4 wherein ring means coaxially surround said hollow body, said ring means, fixedly carrying said longitudinally moving drivers.

References Cited by the Examiner

UNITED STATES PATENTS

| 2,384,628 | 9/45 | Krone | 137—614 XR |
| 2,453,389 | 11/48 | Thomas | 137—614.03 |
| 2,536,602 | 1/51 | Goett | 285 |
| 2,761,701 | 9/56 | Morse | 137—614.04 XR |
| 3,028,179 | 4/62 | Abramoska | 137—614.04 XR |

FOREIGN PATENTS 1,212,141  10/59  France.

WILLIAM F. O'DEA, *Primary Examiner.*